May 13, 1924.
H. E. BRONSON
ELECTRICAL INSECT TRAP
Filed March 15, 1923     2 Sheets-Sheet 1
1,494,213
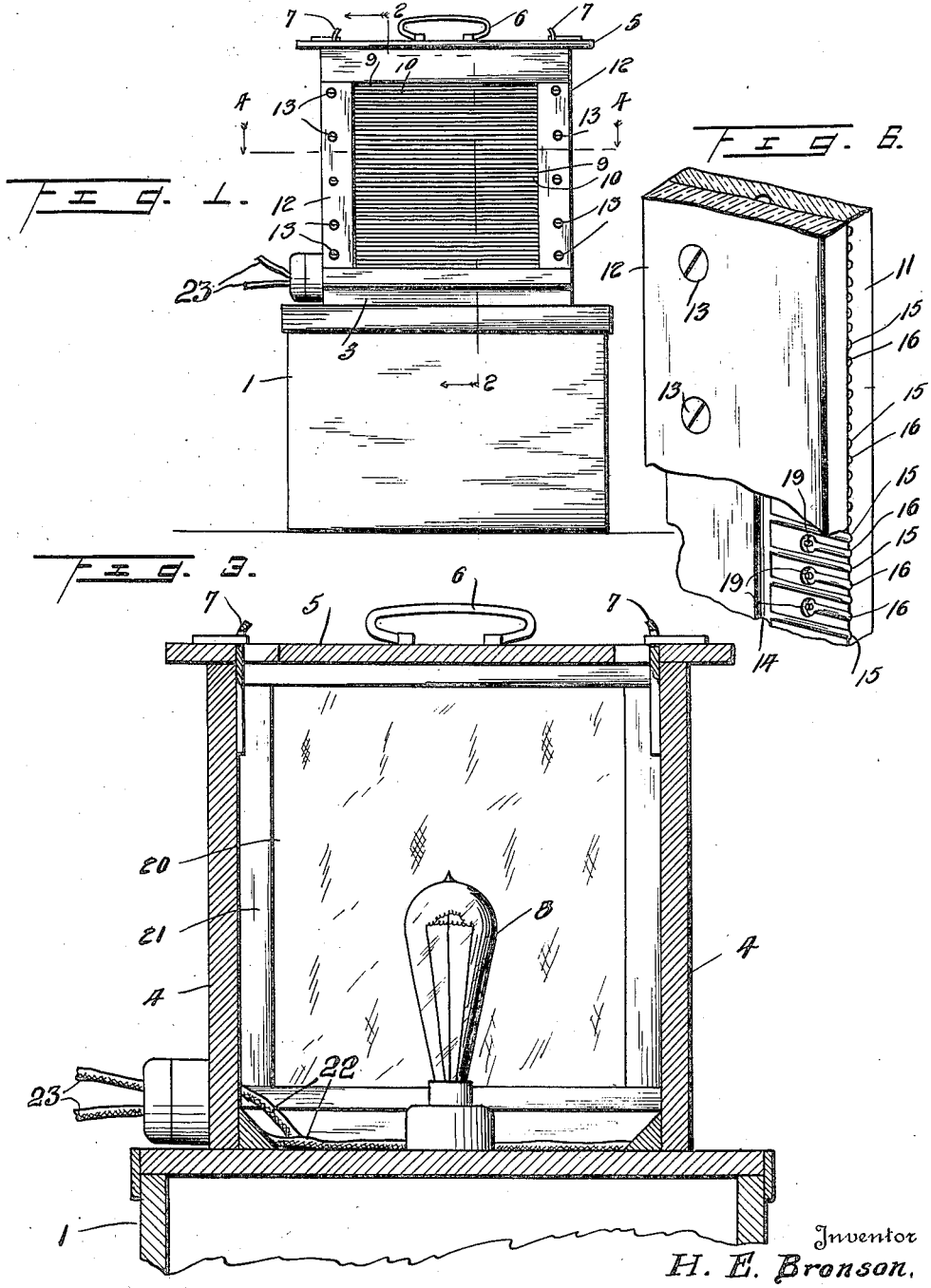
Inventor
H. E. Bronson.
By
Attorney

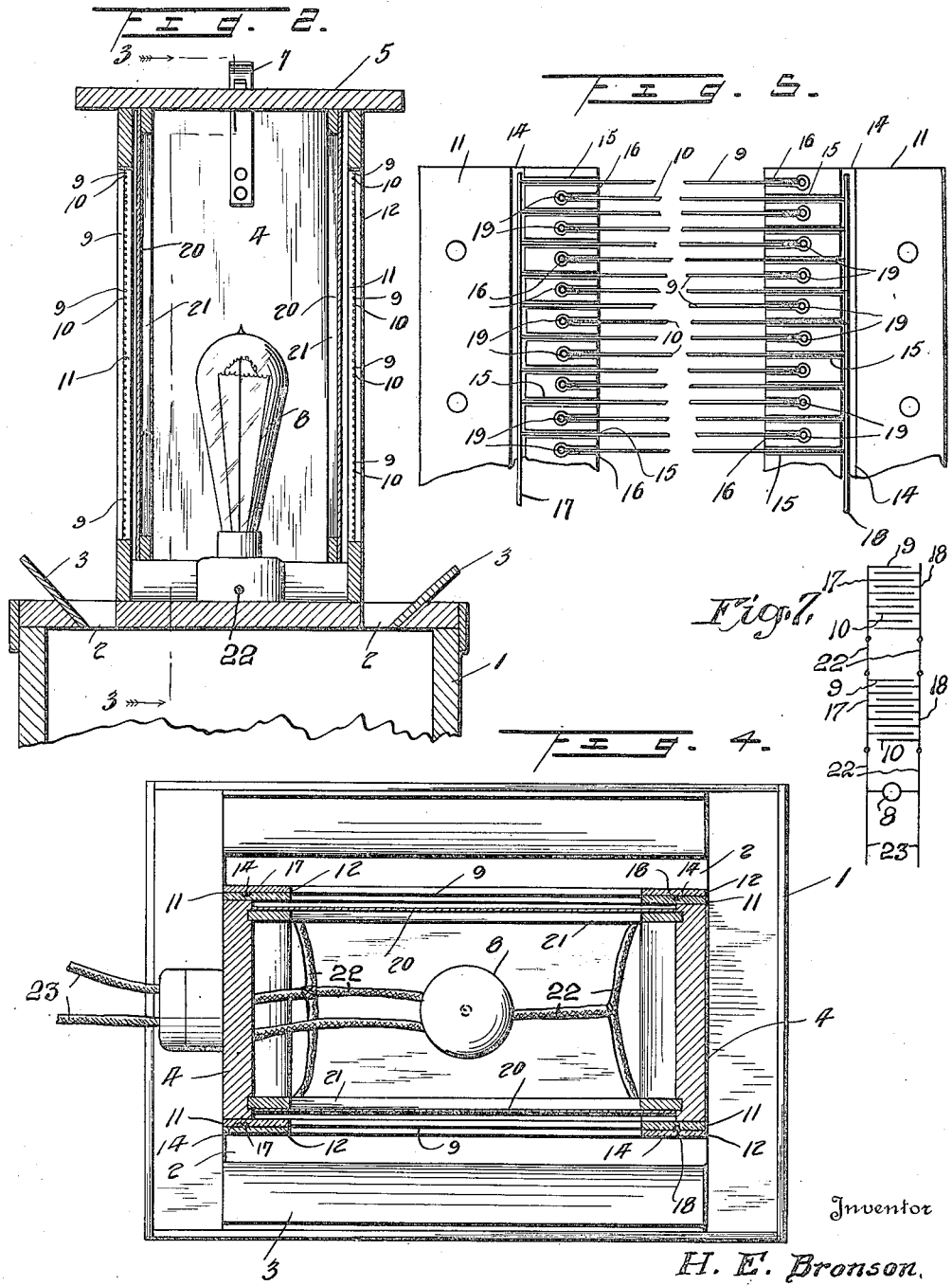

Patented May 13, 1924.

1,494,213

UNITED STATES PATENT OFFICE.

HARRY E. BRONSON, OF MINERAL, WASHINGTON.

ELECTRICAL INSECT TRAP.

Application filed March 15, 1923. Serial No. 625,378.

*To all whom it may concern:*

Be it known that I, HARRY E. BRONSON, a citizen of the United States, residing at Mineral, in the county of Lewis and State of Washington, have invented certain new and useful Improvements in Electrical Insect Traps; and I do hereby declare the following to be a full, clear, and exact description of the invention, such as will enable others skilled in the art to which it appertains to make and use the same.

The invention provides a trap for winged insects and bugs of every description and comprises a box for receiving the electrocuted or stunned bugs and insects, means for attracting the same, and electric devices for electrocuting or stunning the bugs and insects which drop and are received in the box or like container from which they may be removed from time to time and disposed of as found most advantageous.

One of the principal objects of the invention is the provision of a device of the nature stated which may have advertising matter delineated thereon as well as rid a locality of flies, mosquitoes, bugs and insects, said device being portable, easy of manipulation and economical in service.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a side elevation of a device embodying the invention,

Figure 2 is a vertical section on the line 2—2 of Figure 1, looking in the direction of the arrows, Figure 3 is a vertical section on the line 3—3 of Figure 2, looking in the direction designated by the arrows, Figure 4 is a horizontal section on the line 4—4 of Figure 1, Figure 5 is a detail view showing more clearly the mounting for the electrodes forming the screen, Figure 6 is a detail view of the insulation receiving and supporting the electrodes, and Figure 7 is a diagram of the electrical parts.

Corresponding and like parts are referred to in the following description and designated in the several views of the drawings by like reference characters.

The numeral 1 designates a box which forms a hollow base for the device and a container for reception of the bugs and insects. Slots 2 are formed in opposite side portions of the top of the box and provide ingress for the insects. The slots 2 flare outwardly and deflectors 3 in line with the outer sides of the slots serve to direct the bugs and insects through the slots into the box or container. The top of the box or container is preferably removable to admit of ready access to the interior, whereby to remove the accumulation of bugs and insects.

Mounted upon the box are the means for attracting the bugs and insects and destroying the same, and these means include a suitable frame comprising end pieces 4, a top 5 and side screens, each comprising electrodes electrically insulated and spaced from one another and closely related, whereby to insure the completing of the circuit through a bug or insect lighting upon or coming in contact with the screen. The top 5 is preferably detachable and is provided with a handle 6 and is held in place by catches 7. An electric lamp 8 is disposed within the keeper structure and for convenience is mounted upon the top of the box 1.

Each of the side screens comprises a plurality of electrodes 9 and 10 which are spaced apart a short distance and electrically insulated to prevent short circuiting and to insure the completing of the circuit through a bug or insect lighting upon or coming in contact with a screen. The electrodes preferably consist of wire and the supporting means therefor consists of strips 11 and 12 of insulating material, such as porcelain or fibre, the ends of the electrodes being secured between said strips which, when placed together, are made secure by bolts or screws 13. Each strip 11 is formed with a longitudinal groove 14 and lateral grooves 15 leading therefrom, and intermediate grooves 16 which are enlarged at their inner ends and receive tits 19 which engage one end of the electrodes which are looped therearound. Conductors 17 are disposed in the grooves 14 and one end of each electrode 9 is connected thereto. The opposite ends of the electrodes 9 are looped around the tits 19 and fitted in the grooves 16 of the opposite strip. Conductors 18 are arranged in the longitudinal grooves 14 of the last mentioned strips and one end of each electrode 10 is connected thereto, the opposite end of said electrodes being looped about the tits 19 and fitted in the grooves 16 of the strips receiving the conductors 17. The electrodes are of uniform length and are stretched when the strips to which the electrodes are attached are preferably spaced and attached to opposite sides of the frame forming the superstructure. The electric lamp 8 and the two sets of electrodes comprising each of the screens, as shown in Figure 7, are arranged in parallel in an electric circuit of high voltage and have wires 22 connecting them and feed wires 23 leading thereto and adapted for attachment to any suitable source of electrical energy and have feed wires 22 connecting them and adapted for attachment to any suitable source of electrical energy, to insure the destruction of insects and bugs lighting upon or coming in contact with the screens.

Curtains 20 are disposed inwardly from the screens and are attached to frames 21. These curtains may be of cloth or other suitable material and are designed to receive a suitable bait for attracting the insects, bugs and flies and they may also have suitable advertising matter delineated thereon.

What is claimed is:

1. A screen for a trap, the same comprising spaced strips, each containing a longitudinal groove and lateral grooves leading from the longitudinal groove, and other grooves intermediate the lateral grooves and enlarged at their inner ends, conductors in the longitudinal grooves, and electrodes connected with the conductors and disposed in the lateral grooves and having their outer ends fitted in the intermediate grooves of the opposite strip and secured in the enlargements thereof.

2. A screen for a trap comprising strips in spaced relation, each strip having a longitudinal groove and lateral grooves leading from the longitudinal groove, each strip having inner grooves intermediate the lateral grooves provided with tits therein, conductors disposed in the longitudinal grooves, electrodes connected with the conductors disposed in the lateral grooves, the outer ends of the electrodes being fitted in the intermediate grooves and secured to said tits.

In testimony whereof I affix my signature in presence of two witnesses.

HARRY E. BRONSON.

Witnesses:
L. I. WALRATH,
C. A. BROWN.